US012070034B2

(12) United States Patent
Brito et al.

(10) Patent No.: US 12,070,034 B2
(45) Date of Patent: Aug. 27, 2024

(54) SYNERGISTIC HERBICIDAL COMBINATIONS

(71) Applicant: UPL LTD, West Bengal (IN)

(72) Inventors: Alexandre Leite Brito, Mumbai (IN); Bruna Mariele De Almeida, Mumbai (IN); Ferdinando Marcos Lima Silva, Mumbai (IN); Joaquim Ribeiro Da Cunha, Mumbai (IN); Luciano Zanotto Hohmann, Mumbai (IN); Natalia Gonçalves, Mumbai (IN); Sergio Tadeu Decaro Junior, Mumbai (IN); Jaidev Rajnikant Shroff, Dubai (AE); Vikram Rajnikant Shroff, Dubai (AE)

(73) Assignee: UPL LTD, Haldia (IN)

( * ) Notice: Subject to any disclaimer, the term of this patent is extended or adjusted under 35 U.S.C. 154(b) by 701 days.

(21) Appl. No.: 16/637,352

(22) PCT Filed: Jul. 31, 2018

(86) PCT No.: PCT/IB2018/055716
§ 371 (c)(1),
(2) Date: Feb. 7, 2020

(87) PCT Pub. No.: WO2019/030614
PCT Pub. Date: Feb. 14, 2019

(65) Prior Publication Data
US 2021/0392896 A1 Dec. 23, 2021

(30) Foreign Application Priority Data
Aug. 8, 2017 (IN) .............................. 201731028212

(51) Int. Cl.
*A01N 47/36* (2006.01)
*A01N 37/40* (2006.01)
*A01N 43/40* (2006.01)

(52) U.S. Cl.
CPC ............. *A01N 47/36* (2013.01); *A01N 37/40* (2013.01); *A01N 43/40* (2013.01)

(58) Field of Classification Search
None
See application file for complete search history.

(56) References Cited

U.S. PATENT DOCUMENTS

| 5,221,319 A * | 6/1993 | Van Haften | A01N 39/04 |
| | | | 504/144 |
| 2011/0092366 A1 | 4/2011 | Griveau et al. | |
| 2014/0256552 A1 | 9/2014 | Loughner et al. | |
| 2016/0213000 A1* | 7/2016 | Etcheverry | A01N 43/82 |

FOREIGN PATENT DOCUMENTS

| CN | 104542663 A | 4/2015 |
| CN | 106472529 A | 3/2017 |
| WO | 2010123871 A1 | 10/2010 |
| WO | 2014093210 A1 | 6/2014 |
| WO | 2014202092 A1 | 12/2014 |
| WO | 2015089014 A1 | 6/2015 |

OTHER PUBLICATIONS www.herbiguide.com.au (available online at http://www.herbiguide.com.au/Descriptions/hg_Metsulfuron_200_plus_Picloram_240.htm as of Sep. 26, 2011) (Year: 2011).*
Herbiguide (provided in Applicant's IDS dated Feb. 7, 2020 and available at http://www.herbiguide.com.au/Descriptions/hg_Metsulfuron_200_plus_Picloram_240.htm as of Aug. 26, 2011) (Year: 2011).*
Corteva Agriscience (Tordon 75-D, available online at https://www.pestgenie.com.au/Label/dow/tordon_75d_14103058.pdf, accessed Nov. 3, 2022) (Year: 2022).*
Wilson (A Dissertation Submitted to the Graduate Division of the University of Hawaii in partial fulfillment of the requirement for the Degree of Doctor of Philosophy, 1974) (Year: 1974).*
Bradley et al.(Weed Technology 18:795-800, 2004) (Year: 2004).*
Cimarron Max herbicide, Bayer, [retrieved from internet on Sep. 17, 2018] <URL:https://www.packedbybayer.com/~/media/BackedByBayer/Product%20Labels%20-%20pdf/Cimarron%20Max.ashx> published on Dec. 5, 2015 as per Wayback Machine.
Herbguide combination 'Metsulfuron 200 plus Picloram 240' [retrieved from internet on Sep. 21, 2018] <URL: http://www.herbguide.com.au/Descriptions/hg_Metsulfuron_200_plus_Picloram_240.htm> published on Aug. 26, 2011 as per Wayback Machine.
Humphrys, M. et al.; "Control Options for Rubber Bush" Department of Land Resource Management, Northern Territory Government [retrieved from internet on Sep. 17, 2018] <https://denr.nt.gov.au/_data/assets/pdf_file/0006/257991/control-options-rubber-bush.pdf> published on Mar. 9, 2017 as per Wayback Machine.
International Search Report and Written Opinion for International Application PCT/IB2018/055716; International Filing Date: Jul. 31, 2018; Date of Mailing: Sep. 26, 2018; 15 pages.
Tordon 75-D and like terms, Databse Search, Applicant/Inventor Search UPL Ltd, Brito, De Almeida, Silva, Da Cunha, Hohmann, Goncalves, Decaro Junion, Shroff.
Tordon 75-D herbicide Label, Dow Agrosciences LLC [retrieved from internet on Sep. 21, 2018] <URL://www.dowagro.com/en-au/australia/product_finder/herbicides/tordon-75d> published on Jan. 24, 2016 as per Wayback Machine.

* cited by examiner

*Primary Examiner* — Craig D Ricci
(74) *Attorney, Agent, or Firm* — CANTOR COLBURN LLP

(57) ABSTRACT

A herbicidal combination comprising at least two synthetic auxins, or at least two synthetic auxins with at least one ALS inhibitor, a composition comprising these combinations, a method of use of these combinations and a kit comprising the components of these combinations.

3 Claims, No Drawings

SYNERGISTIC HERBICIDAL COMBINATIONS

CROSS REFERENCE TO RELATED APPLICATIONS

This application is a National Stage application of PCT/IB2018/055716 filed on Jul. 31, 2018, which claims the benefit of Indian Application No. IN 201731028212, filed on Aug. 8, 2017, both of which are incorporated by reference in their entirety herein.

TECHNICAL FIELD

The present invention relates to a herbicidal combination for controlling undesirable plants. The present invention more specifically relates to a synergistic combination of herbicides for controlling weeds.

BACKGROUND AND PRIOR ART

Unwanted plants such as weeds effect soil resources available for cultivated crops and can lead to a decrease in yield and eventually crop loss. Modern herbicides are used to either control or suppress these undesirable plants so as to allow sown crops a greater share of nutrients. Farmers usually control these plants at the pre-plant stage as well as after sowing.

Current practices include combining herbicides with varied modes of action, which allows for broader spectrum of control and resistance management. The herbicidal effectiveness of a compound cannot be predicted from an examination of the substituent groups of the compound. Often quite closely related compounds possess different weed control abilities. Various herbicides of the same class of compounds may have complementary areas of activity and thus can be useful to control a variety of weeds upon application of a combination. Furthermore, the various herbicides are not completely effective so as to control all the infesting weeds in a field crop, which necessitates the use of herbicidal combinations.

Synthetic Auxins are used for controlling broadleaf weeds in grass crops, pastures, and industry. These are readily absorbed through both roots and foliage and translocate by phloem or xylem to meristematic tissue interfering with cell formation that results in abnormal root and shoot growth. Application of these herbicides results in the disruption of several growth processes in susceptible plants which likely affects cell wall plasticity and nucleic acid metabolism as well as protein synthesis, cell division and growth, and stimulate ethylene evolution, which may in some cases produce the characteristic epinastic symptoms associated with exposure to these herbicides.

Picloram is a synthetic auxin which controls broadleaf weeds. Combination of Picloram with other herbicides are known from WO2014093210A1 (Ovalle et. al) or WO2014202092A1 (Schlosser et. al). Ovalle et al teach a combination comprising picloram with aminocyclopyrachlor. Schlosser et al teach a combination comprising picloram and pethoxamid.

2,4-D is a synthetic auxin used for the control of broad-leaved weeds. Combinations of 2,4D with other herbicides are known in the prior art including glyphosate (WO2010123871 A1), glufosinate (WO2015089014 A1) and other herbicides.

Herbicides that inhibit acetolactate synthase (ALS) enzyme are broad spectrum herbicides. These herbicides are an excellent tool for controlling post emergent herbicide for broad leaf weed control in various crops.

Combinations of herbicides are used to control a broader range of weeds. However, the combination of herbicides may not always result in the desired effect. Combination of herbicides may lead to an additive effect or an antagonistic effect. It may also result in phytotoxicity to the crops making it an undesirable combination. Agronomists must therefore, carefully select the herbicides that can be combined to offer a synergistic effect that would control weeds while having no phytotoxic effect on the crop, and reduce the chances of development of herbicide resistant weeds. There still remains a need for improved herbicidal combinations that can effectively control weeds thereby improving yield and plant health, with reduced phytotoxicity.

There is therefore a need in the art for combinations that have advantageous properties such as an herbicidal combination that is synergistic, helps in resistance management, reduces dosage of herbicides used thus causing minimal damage to the environment, or a herbicidal combination that has excellent residual effects.

Embodiments of the present invention may therefore ameliorate one or more of the above mentioned problems:

OBJECTS OF THE INVENTION

Therefore, one object of the present invention is to provide a synergistic herbicidal combination.

Another object of the present invention is to provide a method of controlling weeds at a locus by application of a synergistic herbicidal combination.

Another object of the present invention is to provide a composition comprising a synergistic herbicidal combination.

Another object of the present invention is to provide a method of controlling herbicide resistant weeds.

Yet another object of the present invention is to provide a method of increasing yield in a crop by application of a synergistic herbicidal combination.

Another object of the present invention is to provide a method of improving the plant health by application of a synergistic herbicidal combination.

Some or all these and other objects of the invention can be achieved by way of the invention described hereinafter.

SUMMARY OF THE INVENTION

A herbicidal combination comprising at least two synthetic auxin herbicides and at least one ALS inhibitor herbicide.

A method of controlling weeds at a locus, the method comprising applying a combination comprising at least two synthetic auxin herbicides and at least one ALS inhibitor herbicide to the locus.

A composition comprising at least two synthetic auxin herbicides; at least one ALS inhibitor herbicide and at least one agrochemically acceptable excipient.

A method of controlling weeds at a locus, said method comprising applying a composition comprising at least two synthetic auxin herbicides; at least one ALS inhibitor herbicide and at least one agrochemically acceptable excipient.

DETAILED DESCRIPTION OF THE INVENTION

The term herbicide, as used herein, shall mean an active ingredient that kills, controls or otherwise adversely modifies the growth of plants. As used herein, a herbicidally effective or vegetation controlling amount is an amount of active ingredient that causes a "herbicidal effect," i.e., an adversely modifying effect and includes deviations from natural development, killing, regulation, desiccation, or retardation. The terms "plants" and "vegetation" include, but are not limited to, germinant seeds, emerging seedlings, plants emerging from vegetative propagules, and established vegetation. The term "locus" as used herein shall denote the vicinity of a desired crop in which weed control, typically selective weed control is desired. The locus includes the vicinity of desired crop plants wherein the weed infestation has either emerged or is yet to emerge. The term crop shall include a multitude of desired crop plants or an individual crop plant growing at a locus.

The present inventors have found that the combination of herbicides belonging to classes of synthetic auxins with ALS inhibitor herbicides results in a synergistic control of undesirable plants, at the locus of the desirable crop plants.

Thus an embodiment of the present invention may be a herbicidal combination comprising at least two synthetic auxins and at least one ALS inhibitor herbicide.

The synthetic auxins of the present invention may be selected from (2,4-D); 2,4-DB; dicamba; chloramben; 2,4,5-T; clomeprop; dichlorprop; dichlorprop-P; MCPA; MCPB; mecoprop; aminopyralid; clopyralid; fluroxypyr; halauxifen-methyl; picloram; triclopyr; aminocyclopyrachlor; quinclorac; quinmerac and their salts; and esters thereof.

In an embodiment, the combination of the present invention comprises at least two synthetic auxins.

In an embodiment, the synthetic auxins of the present invention may be selected from the group consisting of 2,4-D and dicamba; 2,4-D and MCPA; 2,4-D and fluroxypyr; 2,4-D and halauxifen-methyl; 2,4-D and picloram; 2,4-D and triclopyr; 2,4-D and quinclorac; 2,4-D and quinmerac; dicamba and MCPA; dicamba and fluroxypyr; dicamba and halauxifen-methyl; dicamba and picloram; dicamba and triclopyr; dicamba and quinclorac; dicamba and quinmerac; MCPA and fluroxypyr; MCPA and halauxifen-methyl; MCPA and picloram; MCPA and triclopyr; MCPA and quinclorac; MCPA and quinmerac; fluroxypyr and halauxifen-methyl; fluroxypyr and picloram; fluroxypyr and triclopyr; fluroxypyr and quinclorac; fluroxypyr and quinmerac; halauxifen-methyl and picloram; halauxifen-methyl and triclopyr; halauxifen-methyl and quinclorac; halauxifen-methyl and quinmerac; picloram and triclopyr; picloram and quinmerac; picloram and quinclorac; triclopyr and quinclorac; triclopyr and quinmerac; and quinclorac and quinmerac.

In an embodiment, at least two synthetic auxins of the present invention are 2,4-D and picloram.

In an embodiment, at least two synthetic auxins of the present invention may be halauxifen-methyl and picloram.

In an embodiment, the synthetic auxins of the present invention may be a combination of 2,4-D, picloram and triclopyr.

ALS inhibitor herbicides cover a wide chemical class of compounds including sulfonylureas, imidazolinones, triazolopyrimidines, and pyrimidinyl thiobenzoates.

In an embodiment, the ALS inhibitor herbicides are sulfonylurea herbicides.

Sulfonylurea herbicides are known in the art. Examples of such sulfonylurea herbicides include rimsulfuron, metsulfuron, metsulfuron methyl, bensulfuron methyl, ethametsulfuron, nicosulfuron, triasulfuron, primisulfuron, bensulfuron, chlorimuron, chlorimuron-ethyl, chlorsulfuron, sulfometuron, thifensulfuron, tribenuron, triflusuluron, clopyrasulfuron and pyrazosulfuron.

Thus, an aspect of the present invention may provide synergistic combinations of:
  (a) at least two synthetic auxins selected from the group comprising (2,4-D), 2,4-DB, dicamba, chloramben, 2,4,5-T, clomeprop, dichlorprop, dichlorprop-P, MCPA, MCPB, mecoprop, aminopyralid, clopyralid, fluroxypyr, halauxifen-methyl, picloram, triclopyr, aminocyclopyrachlor, quinclorac, quinmerac; and
  (b) at least one ALS inhibitor herbicide selected from sulfonylurea herbicides.

Thus, in an embodiment, the sulfonylurea herbicide may be selected from the group consisting of amidosulfuron, azimsulfuron, bensulfuron, chlorimuron, cyclosulfamuron, ethoxysulfuron, flazasulfuron, flucetosulfuron, flupyrsulfuron, foramsulfuron, halosulfuron, imazosulfuron, mesosulfuron, metazosulfuron, methiopyrisulfuron, monosulfuron, nicosulfuron, orthosulfamuron, oxasulfuron, primisulfuron, propyrisulfuron, pyrazosulfuron, rimsulfuron, sulfometuron, sulfosulfuron, trifloxysulfuron, zuomihuanglong, chlorsulfuron, cinosulfuron, ethametsulfuron, iodosulfuron, iofensulfuron, metsulfuron, prosulfuron, thifensulfuron, triasulfuron, tribenuron, triflusulfuron, and tritosulfuron.

Thus, an aspect of the present invention may provide synergistic combinations of:
  (a) a synthetic auxins combination selected from the group consisting of 2,4-D and dicamba; 2,4-D and MCPA; 2,4-D and fluroxypyr; 2,4-D and halauxifen-methyl; 2,4-D and picloram; 2,4-D and triclopyr; 2,4-D and quinclorac; 2,4-D and quinmerac; dicamba and MCPA; dicamba and fluroxypyr; dicamba and halauxifen-methyl; dicamba and picloram; dicamba and triclopyr; dicamba and quinclorac; dicamba and quinmerac; MCPA and fluroxypyr; MCPA and halauxifen-methyl; MCPA and picloram; MCPA and triclopyr; MCPA and quinclorac; MCPA and quinmerac; fluroxypyr and halauxifen-methyl; fluroxypyr and picloram; fluroxypyr and triclopyr; fluroxypyr and quinclorac; fluroxypyr and quinmerac; halauxifen-methyl and picloram; halauxifen-methyl and triclopyr; halauxifen-methyl and quinclorac; halauxifen-methyl and quinmerac; picloram and triclopyr; picloram and quinmerac; picloram and quinclorac; triclopyr and quinclorac; triclopyr and quinmerac; and quinclorac and quinmerac; and
  (b) a sulfonylurea herbicide selected from the group consisting of amidosulfuron, azimsulfuron, bensulfuron, chlorimuron, cyclosulfamuron, ethoxysulfuron, flazasulfuron, flucetosulfuron, flupyrsulfuron, foramsulfuron, halosulfuron, imazosulfuron, mesosulfuron, metazosulfuron, methiopyrisulfuron, monosulfuron, nicosulfuron, orthosulfamuron, oxasulfuron,
  primisulfuron, propyrisulfuron, pyrazosulfuron, rimsulfuron, sulfometuron, sulfosulfuron, trifloxysulfuron, zuomihuanglong, chlorsulfuron, cinosulfuron, ethametsulfuron, iodosulfuron, iofensulfuron, metsulfuron, prosulfuron, thifensulfuron, triasulfuron, tribenuron, triflusulfuron, and tritosulfuron.

In an embodiment, the sulfonylurea herbicide is metsulfuron methyl.

Therefore, an embodiment of the present invention may provide a combination comprising:
  (a) picloram;
  (b) 2,4-D; and
  (c) Metsulfuron methyl.

In an embodiment, the ALS inhibitor herbicide may be imidazolinone herbicide.

In an embodiment, the imidazolinone herbicide may be selected from the group consisting of imazamethabenz, imazamox, imazapic, imazapyr, imazaquin and imazethapyr.

In an embodiment, the ALS inhibitor herbicide may be triazolopyrimidine herbicide.

In an embodiment, the triazolopyrimidine herbicide may be selected from the group consisting of chloransulam, diclosulam, florasulam, flumetsulam, metosulam, penoxsulam and pyroxsulam.

In an embodiment, the ALS inhibitor herbicide may be a pyrimidinyl benzoic acid herbicide.

In an embodiment, the pyrimidinyl benzoic acid herbicide may be selected from bispyribac, pyriminobac and pyrithiobac.

In an embodiment, the combinations of the present invention include the following preferred combinations.

In an embodiment, each individual row appearing in the table below represents the combinations in an embodiment of the present invention.

| S No. | Synethetic auxin I | Synthetic auxin II | ALS inhibitor |
|---|---|---|---|
| 1 | 2,4-D | Dicamba | Metsulfuron methyl |
| 2 | 2,4-D | Dicamba | Bensulfuron methyl |
| 3 | 2,4-D | Dicamba | Pyrazosulfuron |
| 4 | 2,4-D | Dicamba | Imazamox |
| 5 | 2,4-D | Dicamba | Imazapic |
| 6 | 2,4-D | Dicamba | Imazapyr |
| 7 | 2,4-D | Dicamba | Imazethapyr |
| 8 | 2,4-D | Dicamba | Penoxsulam |
| 9 | 2,4-D | Dicamba | Pyroxsulam |
| 10 | 2,4-D | Dicamba | Bispyribac |
| 11 | 2,4-D | MCPA | Metsulfuron methyl |
| 12 | 2,4-D | MCPA | Bensulfuron methyl |
| 13 | 2,4-D | MCPA | Pyrazosulfuron |
| 14 | 2,4-D | MCPA | Imazamox |
| 15 | 2,4-D | MCPA | Imazapic |
| 16 | 2,4-D | MCPA | Imazapyr |
| 17 | 2,4-D | MCPA | Imazethapyr |
| 18 | 2,4-D | MCPA | Penoxsulam |
| 19 | 2,4-D | MCPA | Pyroxsulam |
| 20 | 2,4-D | MCPA | Bispyribac |
| 21 | 2,4-D | Fluroxypyr | Metsulfuron methyl |
| 22 | 2,4-D | Fluroxypyr | Bensulfuron methyl |
| 23 | 2,4-D | Fluroxypyr | Pyrazosulfuron |
| 24 | 2,4-D | Fluroxypyr | Imazamox |
| 25 | 2,4-D | Fluroxypyr | Imazapic |
| 26 | 2,4-D | Fluroxypyr | Imazapyr |
| 27 | 2,4-D | Fluroxypyr | Imazethapyr |
| 28 | 2,4-D | Fluroxypyr | Penoxsulam |
| 29 | 2,4-D | Fluroxypyr | Pyroxsulam |
| 30 | 2,4-D | Fluroxypyr | Bispyribac |
| 31 | 2,4-D | Halauxifen-methyl | Metsulfuron methyl |
| 32 | 2,4-D | Halauxifen-methyl | Bensulfuron methyl |
| 33 | 2,4-D | Halauxifen-methyl | Pyrazosulfuron |
| 34 | 2,4-D | Halauxifen-methyl | Imazamox |
| 35 | 2,4-D | Halauxifen-methyl | Imazapic |
| 36 | 2,4-D | Halauxifen-methyl | Imazapyr |
| 37 | 2,4-D | Halauxifen-methyl | Imazethapyr |
| 38 | 2,4-D | Halauxifen-methyl | Penoxsulam |
| 39 | 2,4-D | Halauxifen-methyl | Pyroxsulam |
| 40 | 2,4-D | Halauxifen-methyl | Bispyribac |
| 41 | 2,4-D | Picloram | Metsulfuron methyl |
| 42 | 2,4-D | Picloram | Bensulfuron methyl |
| 43 | 2,4-D | Picloram | Pyrazosulfuron |
| 44 | 2,4-D | Picloram | Imazamox |
| 45 | 2,4-D | Picloram | Imazapic |
| 46 | 2,4-D | Picloram | Imazapyr |
| 47 | 2,4-D | Picloram | Imazethapyr |
| 48 | 2,4-D | Picloram | Penoxsulam |
| 49 | 2,4-D | Picloram | Pyroxsulam |
| 50 | 2,4-D | Picloram | Bispyribac |
| 51 | 2,4-D | Triclopyr | Metsulfuron methyl |
| 52 | 2,4-D | Triclopyr | Bensulfuron methyl |
| 53 | 2,4-D | Triclopyr | Pyrazosulfuron |
| 54 | 2,4-D | Triclopyr | Imazamox |
| 55 | 2,4-D | Triclopyr | Imazapic |
| 56 | 2,4-D | Triclopyr | Imazapyr |
| 57 | 2,4-D | Triclopyr | Imazethapyr |
| 58 | 2,4-D | Triclopyr | Penoxsulam |
| 59 | 2,4-D | Triclopyr | Pyroxsulam |
| 60 | 2,4-D | Triclopyr | Bispyribac |
| 61 | 2,4-D | Quinclorac | Metsulfuron methyl |
| 62 | 2,4-D | Quinclorac | Bensulfuron methyl |
| 63 | 2,4-D | Quinclorac | Pyrazosulfuron |
| 64 | 2,4-D | Quinclorac | Imazamox |
| 65 | 2,4-D | Quinclorac | Imazapic |
| 66 | 2,4-D | Quinclorac | Imazapyr |
| 67 | 2,4-D | Quinclorac | Imazethapyr |
| 68 | 2,4-D | Quinclorac | Penoxsulam |
| 69 | 2,4-D | Quinclorac | Pyroxsulam |
| 70 | 2,4-D | Quinclorac | Bispyribac |
| 71 | 2,4-D | Quinmerac | Metsulfuron methyl |
| 72 | 2,4-D | Quinmerac | Bensulfuron methyl |
| 73 | 2,4-D | Quinmerac | Pyrazosulfuron |
| 74 | 2,4-D | Quinmerac | Imazamox |
| 75 | 2,4-D | Quinmerac | Imazapic |
| 76 | 2,4-D | Quinmerac | Imazapyr |
| 77 | 2,4-D | Quinmerac | Imazethapyr |
| 78 | 2,4-D | Quinmerac | Penoxsulam |
| 79 | 2,4-D | Quinmerac | Pyroxsulam |
| 80 | 2,4-D | Quinmerac | Bispyribac |
| 81 | Dicamba | MCPA | Metsulfuron methyl |
| 82 | Dicamba | MCPA | Bensulfuron methyl |
| 83 | Dicamba | MCPA | Pyrazosulfuron |
| 84 | Dicamba | MCPA | Imazamox |
| 85 | Dicamba | MCPA | Imazapic |
| 86 | Dicamba | MCPA | Imazapyr |
| 87 | Dicamba | MCPA | Imazethapyr |
| 88 | Dicamba | MCPA | Penoxsulam |
| 89 | Dicamba | MCPA | Pyroxsulam |
| 90 | Dicamba | MCPA | Bispyribac |
| 91 | Dicamba | Fluroxypyr | Metsulfuron methyl |
| 92 | Dicamba | Fluroxypyr | Bensulfuron methyl |
| 93 | Dicamba | Fluroxypyr | Pyrazosulfuron |
| 94 | Dicamba | Fluroxypyr | Imazamox |
| 95 | Dicamba | Fluroxypyr | Imazapic |
| 96 | Dicamba | Fluroxypyr | Imazapyr |
| 97 | Dicamba | Fluroxypyr | Imazethapyr |
| 98 | Dicamba | Fluroxypyr | Penoxsulam |
| 99 | Dicamba | Fluroxypyr | Pyroxsulam |
| 100 | Dicamba | Fluroxypyr | Bispyribac |
| 101 | Dicamba | Halauxifen-methyl | Metsulfuron methyl |
| 102 | Dicamba | Halauxifen-methyl | Bensulfuron methyl |
| 103 | Dicamba | Halauxifen-methyl | Pyrazosulfuron |
| 104 | Dicamba | Halauxifen-methyl | Imazamox |
| 105 | Dicamba | Halauxifen-methyl | Imazapic |
| 106 | Dicamba | Halauxifen-methyl | Imazapyr |
| 107 | Dicamba | Halauxifen-methyl | Imazethapyr |
| 108 | Dicamba | Halauxifen-methyl | Penoxsulam |
| 109 | Dicamba | Halauxifen-methyl | Pyroxsulam |
| 110 | Dicamba | Halauxifen-methyl | Bispyribac |
| 111 | Dicamba | Picloram | Metsulfuron methyl |
| 112 | Dicamba | Picloram | Bensulfuron methyl |
| 113 | Dicamba | Picloram | Pyrazosulfuron |
| 114 | Dicamba | Picloram | Imazamox |
| 115 | Dicamba | Picloram | Imazapic |
| 116 | Dicamba | Picloram | Imazapyr |
| 117 | Dicamba | Picloram | Imazethapyr |
| 118 | Dicamba | Picloram | Penoxsulam |
| 119 | Dicamba | Picloram | Pyroxsulam |
| 120 | Dicamba | Picloram | Bispyribac |
| 121 | Dicamba | Triclopyr | Metsulfuron methyl |
| 122 | Dicamba | Triclopyr | Bensulfuron methyl |
| 123 | Dicamba | Triclopyr | Pyrazosulfuron |
| 124 | Dicamba | Triclopyr | Imazamox |
| 125 | Dicamba | Triclopyr | Imazapic |
| 126 | Dicamba | Triclopyr | Imazapyr |
| 127 | Dicamba | Triclopyr | Imazethapyr |
| 128 | Dicamba | Triclopyr | Penoxsulam |

| S No. | Synethetic auxin I | Synthetic auxin II | ALS inhibitor |
|---|---|---|---|
| 129 | Dicamba | Triclopyr | Pyroxsulam |
| 130 | Dicamba | Triclopyr | Bispyribac |
| 131 | Dicamba | Quinclorac | Metsulfuron methyl |
| 132 | Dicamba | Quinclorac | Bensulfuron methyl |
| 133 | Dicamba | Quinclorac | Pyrazosulfuron |
| 134 | Dicamba | Quinclorac | Imazamox |
| 135 | Dicamba | Quinclorac | Imazapic |
| 136 | Dicamba | Quinclorac | Imazapyr |
| 137 | Dicamba | Quinclorac | Imazethapyr |
| 138 | Dicamba | Quinclorac | Penoxsulam |
| 139 | Dicamba | Quinclorac | Pyroxsulam |
| 140 | Dicamba | Quinclorac | Bispyribac |
| 141 | Dicamba | Quinmerac | Metsulfuron methyl |
| 142 | Dicamba | Quinmerac | Bensulfuron methyl |
| 143 | Dicamba | Quinmerac | Pyrazosulfuron |
| 144 | Dicamba | Quinmerac | Imazamox |
| 145 | Dicamba | Quinmerac | Imazapic |
| 146 | Dicamba | Quinmerac | Imazapyr |
| 147 | Dicamba | Quinmerac | Imazethapyr |
| 148 | Dicamba | Quinmerac | Penoxsulam |
| 149 | Dicamba | Quinmerac | Pyroxsulam |
| 150 | Dicamba | Quinmerac | Bispyribac |
| 151 | MCPA | Dicamba | Metsulfuron methyl |
| 152 | MCPA | Dicamba | Bensulfuron methyl |
| 153 | MCPA | Dicamba | Pyrazosulfuron |
| 154 | MCPA | Dicamba | Imazamox |
| 155 | MCPA | Dicamba | Imazapic |
| 156 | MCPA | Dicamba | Imazapyr |
| 157 | MCPA | Dicamba | Imazethapyr |
| 158 | MCPA | Dicamba | Penoxsulam |
| 159 | MCPA | Dicamba | Pyroxsulam |
| 160 | MCPA | Dicamba | Bispyribac |
| 161 | MCPA | Fluroxypyr | Metsulfuron methyl |
| 162 | MCPA | Fluroxypyr | Bensulfuron methyl |
| 163 | MCPA | Fluroxypyr | Pyrazosulfuron |
| 164 | MCPA | Fluroxypyr | Imazamox |
| 165 | MCPA | Fluroxypyr | Imazapic |
| 166 | MCPA | Fluroxypyr | Imazapyr |
| 167 | MCPA | Fluroxypyr | Imazethapyr |
| 168 | MCPA | Fluroxypyr | Penoxsulam |
| 169 | MCPA | Fluroxypyr | Pyroxsulam |
| 170 | MCPA | Fluroxypyr | Bispyribac |
| 171 | MCPA | Halauxifen-methyl | Metsulfuron methyl |
| 172 | MCPA | Halauxifen-methyl | Bensulfuron methyl |
| 173 | MCPA | Halauxifen-methyl | Pyrazosulfuron |
| 174 | MCPA | Halauxifen-methyl | Imazamox |
| 175 | MCPA | Halauxifen-methyl | Imazapic |
| 176 | MCPA | Halauxifen-methyl | Imazapyr |
| 177 | MCPA | Halauxifen-methyl | Imazethapyr |
| 178 | MCPA | Halauxifen-methyl | Penoxsulam |
| 179 | MCPA | Halauxifen-methyl | Pyroxsulam |
| 180 | MCPA | Halauxifen-methyl | Bispyribac |
| 181 | MCPA | Picloram | Metsulfuron methyl |
| 182 | MCPA | Picloram | Bensulfuron methyl |
| 183 | MCPA | Picloram | Pyrazosulfuron |
| 184 | MCPA | Picloram | Imazamox |
| 185 | MCPA | Picloram | Imazapic |
| 186 | MCPA | Picloram | Imazapyr |
| 187 | MCPA | Picloram | Imazethapyr |
| 188 | MCPA | Picloram | Penoxsulam |
| 189 | MCPA | Picloram | Pyroxsulam |
| 190 | MCPA | Picloram | Bispyribac |
| 191 | MCPA | Triclopyr | Metsulfuron methyl |
| 192 | MCPA | Triclopyr | Bensulfuron methyl |
| 193 | MCPA | Triclopyr | Pyrazosulfuron |
| 194 | MCPA | Triclopyr | Imazamox |
| 195 | MCPA | Triclopyr | Imazapic |
| 196 | MCPA | Triclopyr | Imazapyr |
| 197 | MCPA | Triclopyr | Imazethapyr |
| 198 | MCPA | Triclopyr | Penoxsulam |
| 199 | MCPA | Triclopyr | Pyroxsulam |
| 200 | MCPA | Triclopyr | Bispyribac |
| 201 | MCPA | Quinclorac | Metsulfuron methyl |
| 202 | MCPA | Quinclorac | Bensulfuron methyl |
| 203 | MCPA | Quinclorac | Pyrazosulfuron |
| 204 | MCPA | Quinclorac | Imazamox |
| 205 | MCPA | Quinclorac | Imazapic |
| 206 | MCPA | Quinclorac | Imazapyr |
| 207 | MCPA | Quinclorac | Imazethapyr |
| 208 | MCPA | Quinclorac | Penoxsulam |
| 209 | MCPA | Quinclorac | Pyroxsulam |
| 210 | MCPA | Quinclorac | Bispyribac |
| 211 | MCPA | Quinmerac | Metsulfuron methyl |
| 212 | MCPA | Quinmerac | Bensulfuron methyl |
| 213 | MCPA | Quinmerac | Pyrazosulfuron |
| 214 | MCPA | Quinmerac | Imazamox |
| 215 | MCPA | Quinmerac | Imazapic |
| 216 | MCPA | Quinmerac | Imazapyr |
| 217 | MCPA | Quinmerac | Imazethapyr |
| 218 | MCPA | Quinmerac | Penoxsulam |
| 219 | MCPA | Quinmerac | Pyroxsulam |
| 220 | MCPA | Quinmerac | Bispyribac |
| 221 | Fluroxypyr | Halauxifen-methyl | Metsulfuron methyl |
| 222 | Fluroxypyr | Halauxifen-methyl | Bensulfuron methyl |
| 223 | Fluroxypyr | Halauxifen-methyl | Pyrazosulfuron |
| 224 | Fluroxypyr | Halauxifen-methyl | Imazamox |
| 225 | Fluroxypyr | Halauxifen-methyl | Imazapic |
| 226 | Fluroxypyr | Halauxifen-methyl | Imazapyr |
| 227 | Fluroxypyr | Halauxifen-methyl | Imazethapyr |
| 228 | Fluroxypyr | Halauxifen-methyl | Penoxsulam |
| 229 | Fluroxypyr | Halauxifen-methyl | Pyroxsulam |
| 230 | Fluroxypyr | Halauxifen-methyl | Bispyribac |
| 231 | Fluroxypyr | Picloram | Metsulfuron methyl |
| 232 | Fluroxypyr | Picloram | Bensulfuron methyl |
| 233 | Fluroxypyr | Picloram | Pyrazosulfuron |
| 234 | Fluroxypyr | Picloram | Imazamox |
| 235 | Fluroxypyr | Picloram | Imazapic |
| 236 | Fluroxypyr | Picloram | Imazapyr |
| 237 | Fluroxypyr | Picloram | Imazethapyr |
| 238 | Fluroxypyr | Picloram | Penoxsulam |
| 239 | Fluroxypyr | Picloram | Pyroxsulam |
| 240 | Fluroxypyr | Picloram | Bispyribac |
| 241 | Fluroxypyr | Triclopyr | Metsulfuron methyl |
| 242 | Fluroxypyr | Triclopyr | Bensulfuron methyl |
| 243 | Fluroxypyr | Triclopyr | Pyrazosulfuron |
| 244 | Fluroxypyr | Triclopyr | Imazamox |
| 245 | Fluroxypyr | Triclopyr | Imazapic |
| 246 | Fluroxypyr | Triclopyr | Imazapyr |
| 247 | Fluroxypyr | Triclopyr | Imazethapyr |
| 248 | Fluroxypyr | Triclopyr | Penoxsulam |
| 249 | Fluroxypyr | Triclopyr | Pyroxsulam |
| 250 | Fluroxypyr | Triclopyr | Bispyribac |
| 251 | Fluroxypyr | Quinclorac | Metsulfuron methyl |
| 252 | Fluroxypyr | Quinclorac | Bensulfuron methyl |
| 253 | Fluroxypyr | Quinclorac | Pyrazosulfuron |
| 254 | Fluroxypyr | Quinclorac | Imazamox |
| 255 | Fluroxypyr | Quinclorac | Imazapic |
| 256 | Fluroxypyr | Quinclorac | Imazapyr |
| 257 | Fluroxypyr | Quinclorac | Imazethapyr |
| 258 | Fluroxypyr | Quinclorac | Penoxsulam |
| 259 | Fluroxypyr | Quinclorac | Pyroxsulam |
| 260 | Fluroxypyr | Quinclorac | Bispyribac |
| 261 | Fluroxypyr | Quinmerac | Metsulfuron methyl |
| 262 | Fluroxypyr | Quinmerac | Bensulfuron methyl |
| 263 | Fluroxypyr | Quinmerac | Pyrazosulfuron |
| 264 | Fluroxypyr | Quinmerac | Imazamox |
| 265 | Fluroxypyr | Quinmerac | Imazapic |
| 266 | Fluroxypyr | Quinmerac | Imazapyr |
| 267 | Fluroxypyr | Quinmerac | Imazethapyr |
| 268 | Fluroxypyr | Quinmerac | Penoxsulam |
| 269 | Fluroxypyr | Quinmerac | Pyroxsulam |
| 270 | Fluroxypyr | Quinmerac | Bispyribac |
| 271 | Halauxifen-methyl | Picloram | Metsulfuron methyl |
| 272 | Halauxifen-methyl | Picloram | Bensulfuron methyl |
| 273 | Halauxifen-methyl | Picloram | Pyrazosulfuron |
| 274 | Halauxifen-methyl | Picloram | Imazamox |
| 275 | Halauxifen-methyl | Picloram | Imazapic |
| 276 | Halauxifen-methyl | Picloram | Imazapyr |
| 277 | Halauxifen-methyl | Picloram | Imazethapyr |
| 278 | Halauxifen-methyl | Picloram | Penoxsulam |
| 279 | Halauxifen-methyl | Picloram | Pyroxsulam |
| 280 | Halauxifen-methyl | Picloram | Bispyribac |
| 281 | Halauxifen-methyl | Triclopyr | Metsulfuron methyl |
| 282 | Halauxifen-methyl | Triclopyr | Bensulfuron methyl |

-continued

| S No. | Synethetic auxin I | Synthetic auxin II | ALS inhibitor |
|---|---|---|---|
| 283 | Halauxifen-methyl | Triclopyr | Pyrazosulfuron |
| 284 | Halauxifen-methyl | Triclopyr | Imazamox |
| 285 | Halauxifen-methyl | Triclopyr | Imazapic |
| 286 | Halauxifen-methyl | Triclopyr | Imazapyr |
| 287 | Halauxifen-methyl | Triclopyr | Imazethapyr |
| 288 | Halauxifen-methyl | Triclopyr | Penoxsulam |
| 289 | Halauxifen-methyl | Triclopyr | Pyroxsulam |
| 290 | Halauxifen-methyl | Triclopyr | Bispyribac |
| 291 | Halauxifen-methyl | Quinclorac | Metsulfuron methyl |
| 292 | Halauxifen-methyl | Quinclorac | Bensulfuron methyl |
| 293 | Halauxifen-methyl | Quinclorac | Pyrazosulfuron |
| 294 | Halauxifen-methyl | Quinclorac | Imazamox |
| 295 | Halauxifen-methyl | Quinclorac | Imazapic |
| 296 | Halauxifen-methyl | Quinclorac | Imazapyr |
| 297 | Halauxifen-methyl | Quinclorac | Imazethapyr |
| 298 | Halauxifen-methyl | Quinclorac | Penoxsulam |
| 299 | Halauxifen-methyl | Quinclorac | Pyroxsulam |
| 300 | Halauxifen-methyl | Quinclorac | Bispyribac |
| 301 | Halauxifen-methyl | Quinmerac | Metsulfuron methyl |
| 302 | Halauxifen-methyl | Quinmerac | Bensulfuron methyl |
| 303 | Halauxifen-methyl | Quinmerac | Pyrazosulfuron |
| 304 | Halauxifen-methyl | Quinmerac | Imazamox |
| 305 | Halauxifen-methyl | Quinmerac | Imazapic |
| 306 | Halauxifen-methyl | Quinmerac | Imazapyr |
| 307 | Halauxifen-methyl | Quinmerac | Imazethapyr |
| 308 | Halauxifen-methyl | Quinmerac | Penoxsulam |
| 309 | Halauxifen-methyl | Quinmerac | Pyroxsulam |
| 310 | Halauxifen-methyl | Quinmerac | Bispyribac |
| 311 | Picloram | Triclopyr | Metsulfuron methyl |
| 312 | Picloram | Triclopyr | Bensulfuron methyl |
| 313 | Picloram | Triclopyr | Pyrazosulfuron |
| 314 | Picloram | Triclopyr | Imazamox |
| 315 | Picloram | Triclopyr | Imazapic |
| 316 | Picloram | Triclopyr | Imazapyr |
| 317 | Picloram | Triclopyr | Imazethapyr |
| 318 | Picloram | Triclopyr | Penoxsulam |
| 319 | Picloram | Triclopyr | Pyroxsulam |
| 320 | Picloram | Triclopyr | Bispyribac |
| 321 | Picloram | Quinclorac | Metsulfuron methyl |
| 322 | Picloram | Quinclorac | Bensulfuron methyl |
| 323 | Picloram | Quinclorac | Pyrazosulfuron |
| 324 | Picloram | Quinclorac | Imazamox |
| 325 | Picloram | Quinclorac | Imazapic |
| 326 | Picloram | Quinclorac | Imazapyr |
| 327 | Picloram | Quinclorac | Imazethapyr |
| 328 | Picloram | Quinclorac | Penoxsulam |
| 329 | Picloram | Quinclorac | Pyroxsulam |
| 330 | Picloram | Quinclorac | Bispyribac |
| 331 | Picloram | Quinmerac | Metsulfuron methyl |
| 332 | Picloram | Quinmerac | Bensulfuron methyl |
| 333 | Picloram | Quinmerac | Pyrazosulfuron |
| 334 | Picloram | Quinmerac | Imazamox |
| 335 | Picloram | Quinmerac | Imazapic |
| 336 | Picloram | Quinmerac | Imazapyr |
| 337 | Picloram | Quinmerac | Imazethapyr |
| 338 | Picloram | Quinmerac | Penoxsulam |
| 339 | Picloram | Quinmerac | Pyroxsulam |
| 340 | Picloram | Quinmerac | Bispyribac |
| 341 | Triclopyr | Quinclorac | Metsulfuron methyl |
| 342 | Triclopyr | Quinclorac | Bensulfuron methyl |
| 343 | Triclopyr | Quinclorac | Pyrazosulfuron |
| 344 | Triclopyr | Quinclorac | Imazamox |
| 345 | Triclopyr | Quinclorac | Imazapic |
| 346 | Triclopyr | Quinclorac | Imazapyr |
| 347 | Triclopyr | Quinclorac | Imazethapyr |
| 348 | Triclopyr | Quinclorac | Penoxsulam |
| 349 | Triclopyr | Quinclorac | Pyroxsulam |
| 350 | Triclopyr | Quinclorac | Bispyribac |
| 351 | Triclopyr | Quinmerac | Metsulfuron methyl |
| 352 | Triclopyr | Quinmerac | Bensulfuron methyl |
| 353 | Triclopyr | Quinmerac | Pyrazosulfuron |
| 354 | Triclopyr | Quinmerac | Imazamox |
| 355 | Triclopyr | Quinmerac | Imazapic |
| 356 | Triclopyr | Quinmerac | Imazapyr |
| 357 | Triclopyr | Quinmerac | Imazethapyr |
| 358 | Triclopyr | Quinmerac | Penoxsulam |
| 359 | Triclopyr | Quinmerac | Pyroxsulam |
| 360 | Triclopyr | Quinmerac | Bispyribac |
| 361 | Quinclorac | Quinmerac | Metsulfuron methyl |
| 362 | Quinclorac | Quinmerac | Bensulfuron methyl |
| 363 | Quinclorac | Quinmerac | Pyrazosulfuron |
| 364 | Quinclorac | Quinmerac | Imazamox |
| 365 | Quinclorac | Quinmerac | Imazapic |
| 366 | Quinclorac | Quinmerac | Imazapyr |
| 367 | Quinclorac | Quinmerac | Imazethapyr |
| 368 | Quinclorac | Quinmerac | Penoxsulam |
| 369 | Quinclorac | Quinmerac | Pyroxsulam |
| 370 | Quinclorac | Quinmerac | Bispyribac |

In an embodiment, the present invention may provide a combination comprising the three herbicides as listed in each individual row from row 1 to row 370 in the table above.

Another aspect of the present invention may provide a composition.

In an embodiment, the composition may comprise the combination comprising the three herbicides as listed in each individual row from row 1 to row 370 in the table above along with an agrochemically acceptable excipient.

Thus, an embodiment of the present invention may provide a composition comprising:
(a) picloram;
(b) 2,4D;
(c) metsulfuron methyl; and
(d) agrochemically acceptable adjuvants.

The combination may be applied to the locus of the weeds in an herbicidally effective amount. The selection of the appropriate effective amounts depends on the density of weed infestation, weather patterns, crop health and many other factors, which may be made conveniently by a person skilled in the art. The effective amounts of these herbicides in the synergistic combination of the present invention is not particularly limiting.

In an embodiment, the combination of the present invention may be combined with at least one other active ingredient selected from the group consisting of herbicides, insecticides, fungicides, biological agents, plant growth activators, fertilizers or combinations thereof.

Thus, in an embodiment, the combination of the present invention may be combined with another herbicide. Exemplary herbicides that may be combined with the combination of the present invention may be selected from, but not limited to, herbicides belonging to classes such as ACCase inhibitors, EPSP synthase inhibitors, auxin transport inhibitors, glutamate synthase inhibitors, HPPD inhibitors, lipid synthesis inhibitors, long chain fatty acid inhibitors, as well as herbicides with unknown modes of action.

In an embodiment, the total amount of synthetic auxins in the composition may typically be in the range of 0.1 to 99% by weight, preferably 0.2 to 90% by weight. The total amount of sulfonylurea herbicide in the composition may be in the range of 0.1 to 99% by weight.

In an embodiment, the constituent herbicides of the combination of the present invention may be admixed in ratio of (1-80):(1-80):(1-80) of first synthetic auxin, second synthetic auxin, and sulfonylurea herbicide respectively. Preferably, the ratio of the constituents of the present invention may be admixed in the ratio of (1-50):(1-50):(1-50) of first synthetic, auxin second synthetic auxin, and sulfonylurea herbicide respectively.

In an embodiment, it was found that the precise ratio or quantities of the herbicides in the present invention was not particularly critical to achieve the synergistic effect as long as the selective herbicides were used at their recommended dosage levels. These recommended dosage levels of the herbicides of the invention are known and do not form a critical part of the instant invention although their selection is important to achieve the desired synergistic effect.

The herbicidal combination of the present invention may be used to target weeds among the crops such corn, rice, wheat, barley, rye, oat, sorghum, cotton, soybean, peanut, buckwheat, beet, rapeseed, sunflower, sugar cane, tobacco, etc.; vegetables: solanaceous vegetables such as eggplant, tomato, pimento, pepper, potato, etc., cucurbit vegetables such as cucumber, pumpkin, zucchini, water melon, melon, squash, etc., cruciferous vegetables such as radish, white turnip, horseradish, kohlrabi, Chinese cabbage, cabbage, leaf mustard, broccoli, cauliflower, etc., asteraceous vegetables such as burdock, crown daisy, artichoke, lettuce, etc, liliaceous vegetables such as green onion, onion, garlic, and asparagus, ammiaceous vegetables such as carrot, parsley, celery, parsnip, etc., chenopodiaceous vegetables such as spinach, Swiss chard, etc., lamiaceous vegetables such as *Perilla frutescens*, mint, basil, etc, strawberry, sweet potato, *Dioscorea japonica*, colocasia, etc., flowers, foliage plants, turf grasses, pastures, fruits: pome fruits such apple, pear, quince, etc, stone fleshy fruits such as peach, plum, nectarine, *Prunus mume*, cherry fruit, apricot, prune, etc., citrus fruits such as orange, lemon, rime, grapefruit, etc., nuts such as chestnuts, walnuts, hazelnuts, almond, pistachio, cashew nuts, macadamia nuts, etc. berries such as blueberry, cranberry, blackberry, raspberry, etc., vines, kaki fruit, olive, plum, banana, oil palm, coffee, date palm, coconuts, etc., trees other than fruit trees; tea, mulberry, flowering plant, trees such as ash, birch, dogwood, *Eucalyptus, Ginkgo biloba*, lilac, maple, *Quercus*, poplar, Judas tree, *Liquidambar formosana*, plane tree, zelkova, Japanese arborvitae, fir wood, hemlock, juniper, *Pinus, Picea*, and *Taxus cuspidate*, etc.

Thus, in another aspect, the present invention provides a method of controlling weeds at a locus, the method comprising applying a combination comprising at least two synthetic auxins and a sulfonylurea herbicide to the locus.

In an embodiment, the present invention provides a method of controlling weeds at a locus, the method comprising applying a combination comprising at least two synthetic auxins and at least one ALS inhibitor to the locus.

Thus, embodiments of the present invention may provide a method of controlling weeds at a locus, said method comprising application of synergistic combination of picloram; 2,4-D; and metsulfuron methyl.

Thus, embodiments of the present invention may provide a method of controlling weeds at a locus, said method comprising application of synergistic combination of picloram; 2,4-D; metsulfuron methyl, and a fourth active ingredient.

In an embodiment, the fourth active ingredient may selected from herbicide, insecticide, fungicide, biological agent, plant growth activator, fertilizers and combinations thereof.

The target weeds may be selected from Urticaceae weeds: *Urtica urens*; Polygonaceae weeds: *Polygonum convolvulus, Polygonum lapathifolium, Polygonum pensylvanicum, Polygonum persicaria, Polygonum longisetum, Polygonum aviculare, Polygonum arenastrum, Polygonum cuspidatum, Rumex japonicus, Rumex crispus, Rumex obtusifolius, Rumex acetosa*; Portulacaceae weeds: *Portulaca oleracea*; Caryophyllaceae weeds: *Stellaria media, Cerastium holosteoides, Cerastium glomeratum, Spergula arvensis, Silene gallica*; Molluginaceae weeds: *Mollugo verticillata*; Chenopodiaceae weeds: *Chenopodium album, Chenopodium ambrosioides, Kochia scoparia, Salsola kali, Atriplex* spp.; Amaranthaceae weeds: *Amaranthus retroflexus, Amaranthus viridis, Amaranthus lividus, Amaranthus spinosus, Amaranthus hybridus, Amaranthus palmeri, Amaranthus rudis, Amaranthus patulus, Amaranthus tuberculatos, Amaranthus blitoides, Amaranthus deflexus, Amaranthus quitensis, Alternanthera philoxeroides, Alternanthera sessilis, Alternanthera tenella*; Papaveraceae weeds: *Papaver rhoeas, Argemone Mexicana*; Brassicaceae weeds: *Raphanus raphanistrum, Raphanus sativus, Sinapis arvensis, Capsella bursa-pastoris, Brassica juncea, Brassica campestris, Descurainia pinnata, Rorippa islandica, Rorippa sylvestris, Thlaspi arvense, Myagrum rugosum, Lepidium virginicum, Coronopus didymus*; Capparaceae weeds: *Cleome affinis*; Fabaceae weeds: *Aeschynomene indica, Aeschynomene rudis, Sesbania exaltata, Cassia obtusifolia, Cassia occidentalis, Desmodium tortuosum, Desmodium adscendens, Trifolium repens, Pueraria lobata, Vicia angustifolia, Indigofera hirsuta, Indigofera truxillensis, Vigna sinensis*; Oxalidaceae weeds: *Oxalis corniculata, Oxalis strica, Oxalis oxyptera*; Geraniaceae weeds: *Geranium carolinense, Erodium cicutarium*; Euphorbiaceae weeds: *Euphorbia helioscopia, Euphorbia maculate, Euphorbia humistrata, Euphorbia esula, Euphorbia heterophylla, Euphorbia brasiliensis, Acalypha australis, Croton glandulosus, Croton lobatus, Phyllanthus corcovadensis, Ricinus communis*; Malvaceae weeds: *Abutilon theophrasti, Sida rhombiforia, Sida cordifolia, Sida spinosa, Sida glaziovii, Sida santaremnensis, Hibiscus trionum, Anoda cristata, Malvastrum coromandelianum* Sterculiaceae weeds: *Waltheria indica*; Violaceae weeds: *Viola arvensis, Viola tricolor*; Cucurbitaceae weeds: *Sicyos angulatus, Echinocystis lobata, Momordica charantia*; Lythraceae weeds: *Lythrum salicaria*; Apiaceae weeds: *Hydrocotyle sibthorpioides*; Sapindaceae weeds: *Cardiospermum halicacabum*; Primulaceae weeds: *Anagallis arvensis*; Asclepiadaceae weeds: *Asclepias syriaca, Ampelamus albidus*; Rubiaceae weeds: *Galium aparine, Galium spurium* var. *echinospermon, Spermacoce latifolia, Richardia brasiliensis, Borreria alata*; Convolvulaceae weeds: *Ipomoea nil, Ipomoea hederacea, Ipomoea purpurea, Ipomoea hederacea* var. *integriuscula, Ipomoea lacunosa, Ipomoea triloba, Ipomoea acuminata, Ipomoea hederifolia, Ipomoea coccinea, Ipomoea quamoclit, Ipomoea grandifolia, Ipomoea aristolochiafolia, Ipomoea cairica, Convolvulus arvensis, Calystegia hederacea, Calystegia japonica, Merremia hedeacea, Merremia aegyptia, Merremia cissoides, Jacquemontia tamnifolia*; Boraginaceae weeds: *Myosotis arvensis*; Lamiaceae weeds: *Lamium purpureum, Lamium amplexicaule, Leonotis nepetaefolia, Hyptis suaveolens, Hyptis lophanta, Leonurus sibiricus, Stachys arvensis*; Solanaceae weeds: *Datura stramonium, Solanum nigrum, Solanum americanum, Solanum ptycanthum, Solanum sarrachoides, Solanum rostratum, Solanum aculeatissimum, Solanum sisymbriifolium, Solanum carolinense, Physalis angulata, Physalis subglabrata, Nicandra physaloides*; Scrophulariaceae weeds: *Veronica hederaefolia, Veronica persica, Veronica arvensis*; Plantaginaceae weeds: *Plantago asiatica*; Asteraceae weeds: *Xanthium pensylvanicum, Xanthium occidentale, Helianthus annuus, Matricaria chamomilla, Matricaria perforata, Chrysanthemum segetum, Matricaria matricarioides, Artemisia princeps, Artemisia vulgaris, Artemisia verlotorum, Solidago altissima, Taraxacum officinale, Galinsoga ciliata, Galinsoga parviflora, Senecio vulgaris, Senecio brasiliensis, Senecio grisebachii, Conyza bonariensis,*

*Conyza canadensis, Ambrosia artemisiaefolia, Ambrosia trifida, Bidens pilosa, Bidens frondosa, Bidens subalternans, Cirsium arvense, Cirsium vulgare, Silybum marianum, Carduus nutans, Lactuca serriola, Sonchus oleraceus, Sonchus asper, Wedelia glauca, Melampodium perfoliatum, Emilia sonchifolia, Tagetes minuta, Blainvillea latifolia, Tridax procumbens, Porophyllum ruderale, Acanthospermum australe, Acanthospermum hispidum, Cardiospermum halicacabum, Ageratum conyzoides, Eupatorium perfoliatum, Eclipta alba, Erechtites hieracifolia, Gamochaeta spicata, Gnaphalium spicatum, Jaegeria hirta, Parthenium hysterophorus, Siegesbeckia orientalis, Soliva sessilis*; Liliaceae weeds: *Allium canadense, Allium vineale*; Commelinaceae weeds: *Commelina communis, Commelina bengharensis, Commelina erecta*; Poaceae weeds: *Echinochloa crus-galli, Setaria viridis, Setaria faberi, Setaria glauca, Setaria geniculata, Digitaria ciliaris, Digitaria sanguinalis, Digitaria horizontalis, Digitaria insularis, Eleusine indica, Poa annua, Alospecurus aequalis, Alopecurus myosuroides, Avena fatua, Sorghum halepense, Sorghum vulgare, Agropyron repens, Lolium multiflorum, Lolium perenne, Lolium rigidum, Bromus secalinus, Bromus tectorum, Hordeum jubatum, Aegilops cylindrica, Phalaris arundinacea, Phalaris minor, Apera spica-venti, Panicum dichotomiflorum, Panicum texanum, Panicum maximum, Brachiaria platyphylla, Brachiaria ruziziensis, Brachiaria plantaginea, Brachiaria decumbens, Brachiaria brizantha, Brachiaria humidicola, Cenchrus echinatus, Cenchrus pauciflorus, Eriochloa villosa, Pennisetum setosum, Chloris gayana, Eragrostis pilosa, Rhynchelitrum repens, Dactyloctenium aegyptium, Ischaemum rugosum, Oryza sativa, Paspalum notatum, Paspalum maritimum, Pennisetum clandestinum, Pennisetum setosum, Rottboellia cochinchinensis*; Cyperaceae weeds: *Cyperus microiria, Cyperus iria, Cyperus odoratus, Cyperus rotundus, Cyperus esculentus, Kyllinga gracillima* Equisetaceae weeds: *Equisetum arvense, Equisetum palustre*, and the like.

In an embodiment, the individual components of the combination of the present invention may be applied to the locus either simultaneously or sequentially, such that at least two auxins and at least one sulfonylurea herbicide may be applied in a tank mix or as a pre-mixed composition.

In an embodiment, combination of the present invention may be applied either pre or post emergent. The advantage of the combination is surprisingly good residual effects, when applied in pre-emergent as well as quick knockdown when applied post emergent leading to quick control of weeds.

The method of control of the present invention may be carried out by spraying the suggested tank mixes, or the individual herbicides may be formulated as a kit-of-parts containing various components that may be mixed as instructed prior to spraying.

In an embodiment the components of the present invention may be packaged such that at least two auxins and at least one sulfonylurea herbicide may be packaged separately and then tank mixed before the spraying.

In another embodiment the components of the present invention may be packaged such that picloram, 2,4-D and metsulfuron methyl may be packaged separately, whereas other additives are packaged separately, such that the two may be tank mixed at the time of spraying.

In another embodiment the components of the present invention may be packaged as composition such that at least two synthetic auxin herbicide and at least one sulfonylurea herbicide may be formulated into one composition and other additives are packaged separately, such that the two may be tank mixed at the time of spraying.

Therefore, in another aspect, the present invention may provide compositions comprising at least two synthetic auxin herbicides, at least one sulfonylurea herbicide and at least one agrochemically acceptable excipient.

In an embodiment, the present invention may provide compositions comprising picloram and 2,4-D and metsulfuron methyl.

In an embodiment, the composition of the present invention may contain agriculturally acceptable adjuvants, carriers, diluents, emulsifiers, fillers, anti-foaming agents, thickening agents, anti-freezing agents, freezing agents etc. The compositions may be either solid or liquids. They can be solids, such as, for example, dusts, granules, water-dispersible granules, microcapsules or wettable powders, or liquids, such as, for example, emulsifiable concentrates, solutions, emulsions or suspensions, ZC formulations. They can also be provided as a pre-mix or tank mixes.

Suitable agricultural adjuvants and carriers may include, but are not limited to, crop oil concentrates; methylated seed oils, emulsified methylated seed oil, nonylphenol ethoxylate; benzylcocoalkyldimethyl quaternary ammonium salt; blend of petroleum hydrocarbon, alkyl esters, organic acid, and anionic surfactant; $C_9$-$C_{11}$ alkylpolyglycoside; phosphated alcohol ethoxylate; natural primary alcohol ($C_{12}$-$C_{16}$) ethoxylate; di-sec-butylphenol EO-PO block copolymer; polysiloxane-methyl cap; nonylphenol ethoxylate, urea ammonium nitrate; tridecyl alcohol (synthetic) ethoxylate (8EO); tallow amine ethoxylate; PEG(400) dioleate-99, alkyl sulfates, such as diethanolammonium lauryl sulfate; alkylarylsulfonate salts, such as calcium dodecylbenzenesulfonate; alkylphenol-alkylene oxide addition products, such as nonylphenol-$C_{18}$ ethoxylate; alcohol-alkylene oxide addition products, such as tridecyl alcohol-$C_{16}$ ethoxylate; soaps, such as sodium stearate; alkyl-naphthalene-sulfonate salts, such as sodium dibutylnaphthalenesulfonate; dialkyl esters of sulfosuccinate salts, such as sodium di(2-ethylhexyl)sulfosuccinate; sorbitol esters, such as sorbitol oleate; quaternary amines, such as lauryl trimethylammonium chloride; polyethylene glycol esters of fatty acids, such as polyethylene glycol stearate; block copolymers of ethylene oxide and propylene oxide; salts of mono and dialkyl phosphate esters; vegetable or seed oils such as soybean oil, rapeseed/canola oil, olive oil, castor oil, sunflower seed oil, coconut oil, corn oil, cottonseed oil, linseed oil, palm oil, peanut oil, safflower oil, sesame oil, tung oil and the like; and esters of the above vegetable oils, methyl esters and the like.

Suitable liquid carriers that may be employed in a composition of the present invention may include water or organic solvents. The organic solvents include, but are not limited to, petroleum fractions or hydrocarbons such as mineral oil, aromatic solvents, paraffinic oils, and the like; vegetable oils such as soybean oil, rapeseed oil, olive oil, castor oil, sunflower seed oil, coconut oil, corn oil, cottonseed oil, linseed oil, palm oil, peanut oil, safflower oil, sesame oil, tung oil and the like; esters of the above vegetable oils; esters of monoalcohols or dihydric, trihydric, or other lower polyalcohols (4-6 hydroxy containing), such as 2-ethyl hexyl stearate, n-butyl oleate, isopropyl myristate, propylene glycol dioleate, di-octyl succinate, di-butyl adipate, di-octyl phthalate and the like; esters of mono, di and polycarboxylic acids and the like. Organic solvents include, but are not limited to toluene, xylene, petroleum naphtha, crop oil, acetone, methyl ethyl ketone, cyclohexanone, trichloroethylene, perchloroethylene, ethyl acetate, amyl acetate, butyl acetate, propylene glycol monomethyl ether and diethylene glycol monomethyl ether, methyl alcohol, ethyl alcohol, isopropyl alcohol, amyl alcohol, ethylene glycol, propylene glycol, glycerine, N-methyl-2-pyrrolidinone, N,N-dimethyl alkylamides, dimethyl sulfoxide.

Solid carriers that may be employed in the compositions of the present invention may include but are not limited to attapulgite, pyrophyllite clay, silica, kaolin clay, kieselguhr, chalk, diatomaceous earth, lime, calcium carbonate, bentonite clay, Fuller's earth, talc, cottonseed hulls, wheat flour, soybean flour, pumice, wood flour, walnut shell flour, lignin, cellulose etc.

Suitable stabilising agents such as buffers such ammonium phosphate dibasic, ammonium sulfate, ammonium, potassium dibasic phosphate, and the like, other stabilizers such as casein, tragacanth, carboxymethyl cellulose (CMC), polyvinyl alcohol (PVA) and the like.

Thus, in another aspect, the present invention provides a method of controlling weeds at a locus, said method comprising applying a composition comprising at least two synthetic auxins, at least one sulfonylurea herbicide and at least one agrochemically acceptable excipient.

Surprisingly, it has been found by the present inventors that at least two synthetic auxins and at least an ALS inhibitor herbicide, preferably a sulfonylurea herbicide, when applied individually, was ineffective in the control of weeds, but demonstrated excellent synergistic control on weeds when applied together. The combination controlled the weed both pre and post emergently. The combination of at least two synthetic auxins and at least a sulfonylurea herbicide synergistically controlled broadleaf weeds, sedges, and grasses at a particular locus. The current invention therefore provides advantageous methods of controlling weeds both pre and post emergently. The present method also provides a broader spectrum of controlling weeds that helps in resistance management, thus preventing the weed from becoming resistant to either of the herbicides whilst providing a broader spectrum of control at lower use rates.

The invention shall now be described with reference to the following specific examples. It should be noted that the example(s) appended below illustrate rather than limit the invention, and that those skilled in the art will be able to design many alternative embodiments without departing from the scope of the present invention.

EXAMPLES

Formulations Studies:

| S. No. | Ingredients | Amount (gms/lit, %) | Generic Name | Function/Role of ingredients |
|---|---|---|---|---|
| 1 | Picloram ácid tech | 96.00 | Picloram ácid tech | Active Igredient |
| 2 | 2,4 D ácid tech | 318.00 | 2,4 D ácid tech | Active Igredient |
| 3 | Metsulfuron Methyl tech | 45.00 | Metsulfuron Methyl tech | Active Igredient |
| 4 | Ammonium phosphate dibasic | 451.00 | Ammonium phosphate dibasic | Neutralizing agent |
| 5 | Sodium dodecylbenzene sulfonate | 30.0 | Agnique 46 NP | Wetting agent |
| 6 | Sulphonated aromatic polymer, sodium salt | 30.0 | Morwet D425 | Dispersant agent |
| 7 | Croscarmellose sodium | 30.0 | Solutab | binder |

The above formulation was also found to solve the technical problem of making metsulfuron molecule compatible with 2,4-D acid and Picloram in the same formulation.

Hitherto, all commercially available products of 2,4-D and picloram were in soluble liquid i.e. SL formulation, which entails the use of water as the solvent. However, metsulfuron-methyl degrades rapidly by hydrolysis in the protonic media e.g. in an aqueous solution (DT50/25° C.=4.7d, pesticide manual), which makes it incompatible in liquid formulations, mostly in SL type formulation in which water is used as solvent. This posed a formulation problem as 2,4D-DMA and Picloram-DMA are conventionally formulated in liquid water-based formulations. Further, in order to render 2,4D-acid and picloram soluble in water, they need to be neutralized by an organic base, producing a soluble salt in water.

In an embodiment, Dimethylammonium was used to neutralize these two acid and insoluble active ingredients in water.

In an embodiment, the present invention also provides a combination comprising 2,4-D ammonium and picloram-ammonium.

In an embodiment, the present invention provides a solid formulation comprising 2,4-D, picloram and metsulfuron-methyl.

In an embodiment, the present invention provides a solid formulation comprising 2,4-D, picloram, metsulfuron-methyl and dibasic ammonium phosphate.

In an embodiment, the present invention provides a solid formulation comprising 2,4-D, picloram, metsulfuron-methyl and sodium dodecylbenzene sulfonate.

In an embodiment, the present invention provides a solid formulation comprising 2,4-D, picloram, metsulfuron-methyl and sodium salt of sulphonated aromatic polymer.

In an embodiment, the present invention provides a solid formulation comprising 2,4-D, picloram, metsulfuron-methyl and croscarmellose sodium.

In an embodiment, the present invention provides a wettable granule (WG) formulation comprising 2,4-D, picloram and metsulfuron-methyl.

In an embodiment, the present invention provides a wettable granule (WG) formulation comprising 2,4-D, picloram and metsulfuron-methyl, wherein the formulation has $D_{90}$ less than 10 microns.

Thus, presenting these active ingredients in a solid formulation avoids the contact of metsulfuron-methyl with the aqueous media and thus avoids its degradation. In order to make the WG formulation possible, 2,4-D acid and picloram were neutralized in an unexpected manner according to the present invention.

Thus, according to the present invention, 2,4-D-acid and picloram were in situ neutralized in the presence of an alkali salt.

In an embodiment, the preferred alkali salt was dibasic ammonium phosphate.

In an embodiment, the present invention also provides a combination comprising 2,4-D ammonium and picloram-ammonium.

In an embodiment, the present invention also provides a combination comprising 2,4-D ammonium, picloram-ammonium and at least one ALS inhibitor herbicide.

Thus, the alkali salt was mixed into the formulation together with Metsulfuron, 2,4-D acid, and Picloram acid, dispersing/wetting agents and other inerts. All the ingredients together were milled into a jet mill up to the particle size being reduced to $d_{90}$<10 microns. To make the dough from this milled powder, a rigorous control of adding minimum water with vigorous mixing process is required. Extrusion of the dough was done with a conventional screw extruder, and granules were dried in the sequence of process until reach moisture contain less than 2%. Fluid bed dryer at 54° C. is used to remove water from granules.

These wettable granule formulation (WG) were applied into the crops after being diluted into the spray solution.

It was found that the alkali salt ammonium phosphate dibasic reacted with 2,4-D acid (solubility=311 mg/l) and Picloram acid (solubility=560 mg/l), producing 2,4-D ammonium salt and Picloram ammonium salt, thereby increasing solubility of both active ingredients into this spray solution.

It was concluded that one of the advantages of the present invention was to render 2,4-D and picloram acids to corresponding salts to make those active ingredients soluble, which resulted into good and uniform application in crops. In the absence of the alkali salts of the invention, the insoluble 2,4-D and picloram acid active ingredients did not have good biological performance and blocked nozzles during spraying.

The formulations of the present invention were then subjected to the efficacy studies.

Synergy Studies

Studies were conducted to compare the weed controlling activity of the combination of at least two synthetic auxins and at least one sulfonylurea herbicide and compared the observed efficacy with the "expected" efficacy. Any difference between the observed and "expected" efficacy could be attributed to synergy between the compounds. The synthetic auxins were picloram and 2,4-D, whereas, the sulfonylurea was metsulfuron methyl. The expected efficacy of the combination was calculated using the well-established Colby method.

In the Colby method, the expected (or predicted) response of a combination of herbicides is calculated by taking the product of the observed response for each individual component of the combination when applied alone divided by 100 and subtracting this value from the sum of the observed response for each component when applied alone. An unexpected enhancement in efficacy of the combination is then determined by comparing the observed response of the combination to the expected (or predicted) response as calculated from the observed response of each individual component alone. If the observed response of the combination is greater than the expected (or predicted) response, or stated conversely, if the difference between the observed and expected response is greater than zero, then the combination is said to be synergistic or unexpectedly effective. (Colby, S. R., Weeds, 1967(15), p. 20-22) The Colby method requires only a single dose of each herbicide applied alone and the mixture of both doses. The formula used to calculate the expected efficacy (EE) which was compared with the observed efficacy (OE) to determine the efficacy of the present invention is explained hereinbelow:

$$EE=(B \text{ efficacy}+A \text{ efficacy}-(B \text{ efficacy}\times A \text{ efficacy})/100)$$

The weed control activity of the individual herbicides of the invention and their combinations were evaluated on weeds such as *Ipomea grandifolia* and *Bidens pilosa* in cotton was evaluated. The trial was carried out in Randomized Complete Block (RCB) method, all field trials were conducted using this method. Each trial were replicated four times and conducted under GEP guidelines. Application volumes were varied for each mixture. Such field trials were carried out at various locations so as to generate independent data, the locations were chosen randomly across Brazil. Picloram, 2,4-D acid and 2,4-D sodium and Metsulfuron methyl were sprayed according to their recommended dosage.

The following formula was used to calculate the expected activity of mixtures containing three active ingredients A, B and C:

$$\text{Expected } (E) = A + B + C - \frac{(AB + AC + BC)}{100} + \frac{ABC}{10{,}000}$$

Where

A=observed efficacy of active ingredient A at the same concentration as used in the mixture.

B=observed efficacy of active ingredient B at the same concentration as used in the mixture.

C=observed efficacy of active ingredient C at the same concentration as used in the mixture.

The herbicide tank mix combinations, application rates, plant species tested, and results are given in the following examples:

Example

In the Colby method, the expected (or predicted) response of a combination of herbicides is calculated by taking the product of the observed response for each individual component of the combination when applied alone divided by 100 and subtracting this value from the sum of the observed response for each component when applied alone. An unexpected enhancement in efficacy of the combination is then determined by comparing the observed response of the combination to the expected (or predicted) response as calculated from the observed response of each individual component alone. If the observed response of the combination is greater than the expected (or predicted) response, or stated conversely, if the difference between the observed and expected response is greater than zero, then the combination is said to be synergistic or unexpectedly effective.

Thus, when the combination of the present invention was analyzed using this method, it demonstrated an observed—expected value of greater than zero which is indicative of an unexpected efficacy. The basis of demonstration of unexpected efficacy by comparison with the Colby formula is that herbicide (A) tested alone would kill a proportion of the target weeds and leave the remaining portion (a %) as survivors. Similarly, herbicide B tested alone will leave (b %) as survivors, and herbicide B tested alone will leave (c %) survivors. When combined, A+B+C will, act independently on the target weed (if unexpected activity is absent); component A leaving a % survivors, which survivors will be controlled by component B and the final survivors being controlled by component C; which has an overall effect of a %*b % c %*100. Subsequently, if the percent control is greater than that predicted by the Colby formula or stated conversely, if the difference between the observed control and the expected control is greater than zero; then unexpected enhancement in activity is acknowledged. The degree to which the difference is greater than zero is not itself critical as long as it is greater than zero; however greater the difference, more significant is the enhancement or the unexpectedness in weed control.

A trial was carried out to check the efficacy of the triple mixture herbicide of the present invention for pasture. Trials were also carried out to check the efficacy of the formulation examples above. The formulation examples were carried out to evaluate the efficacy of two WG formulations of the 2,4-D, picloran and metsulfuron mixture (PED015/16 and PED016/16) for weeds control in pasture compared with the commercial products in tank mixture. These trials were carried out under greenhouse conditions for efficacy studies. The efficacy for *Ipomea grandifolia* and *Bidens pilosa* control in cotton was tested. The two WG formulations which were tested were PED015/16 and PED016/16. PED015/16 was the formulation comprising Picloram (96)+2,4-D acid (318)+Metsulfuron (45); whereas PED016/16 comprised Picloram (96)+2,4-D sodium (318)+Metsulfuron (45).

Thus, in an embodiment, the present invention provides a combination comprising picloram at 96 g per hectare, 2,4-D acid at 318 g per hectare and metsulfuron-methyl at 45 g per hectare.

In an embodiment, the present invention provides a combination comprising picloram at 96 g per hectare, 2,4-D sodium at 318 g per hectare and metsulfuron-methyl at 45 g per hectare.

| Product | Dose (g or mL per hectare) [g a.e. per hectare] | 7 DAA % Control | 7 DAA Colby control | 14 DAA % control | 14 DAA Colby control | 21 DAA % control | 21 DAA Colby control | Conclusion |
|---|---|---|---|---|---|---|---|---|
| Donado (Picloram) | 200.0 [48] | 23.3 | — | 22.3 | — | 30.0 | — | — |
| DMA (2,4-D) | 237.3 [159] | 21.7 | — | 22.7 | — | 27.7 | — | — |
| Zartan (Metsulfuron-methyl) | 37.5 [22.5] | 8.7 | — | 20.7 | — | 22.0 | — | — |
| PED015/16 | 0.5 [48 + 159 + 22.5] | 55.0 | 45.2 | 94.7 | 52.4 | 98.7 | 60.5 | Synergistic (Δ is greater than 0) |
| PED016/16 | 0.5 [48 + 159 + 22.5] | 58.7 | 45.2 | 95.7 | 99.3 | 99.3 | 60.5 | Synergistic (Δ is greater than 0) |
| Donado + DMA + Zartan | 0.5 [48 + 159 + 22.5] | 51.0 | 45.2 | 90.7 | 52.4 | 95.7 | 60.5 | Synergistic (Δ is greater than 0) |

Thus, in an embodiment, the present invention provides a combination comprising picloram at 48 g per hectare, 2,4-D acid at 159 g per hectare and metsulfuron-methyl at 22.5 g per hectare.

In an embodiment, the present invention provides a combination comprising picloram at 48 g per hectare, 2,4-D sodium at 159 g per hectare and metsulfuron-methyl at 22.5 g per hectare.

It was thus found that, under the tested conditions, both formulations PED015/16 and PED016/16 were effective for control of the studied plants (Cotton, *Ipomea grandifolia* and *Bidens pilosa*) at all doses.

In an embodiment, the present invention provides a method of controlling *Ipomea grandifolia* and *Bidens pilosa*, said method comprising applying a combination comprising picloram at 48 g per hectare, 2,4-D acid at 159 g per hectare and metsulfuron-methyl at 22.5 g per hectare to the locus.

In an embodiment, the present invention provides a method of controlling *Ipomea grandifolia* and *Bidens pilosa* in cotton, said method comprising applying a combination comprising picloram at 48 g per hectare, 2,4-D acid at 159 g per hectare and metsulfuron-methyl at 22.5 g per hectare to the locus.

In an embodiment, the present invention provides a method for controlling *Ipomea grandifolia* and *Bidens pilosa*, said method comprising applying a combination comprising picloram at 48 g per hectare, 2,4-D sodium at 159 g per hectare and metsulfuron-methyl at 22.5 g per hectare to the locus.

In an embodiment, the present invention provides a method for controlling *Ipomea grandifolia* and *Bidens pilosa* in cotton, said method comprising applying a combination comprising picloram at 48 g per hectare, 2,4-D sodium at 159 g per hectare and metsulfuron-methyl at 22.5 g per hectare to the locus.

The tank mix at the lowest dose did not control *Ipomoea grandifolia*. In terms of efficacy, both the tested formulations PED015/16 and PED016/16 showed higher efficiency than the tank mix. It was thus concluded that the combinations of the present invention demonstrated proven synergy for the two formulated combinations and tank mix at the lowest dose for cotton control according to the Colby formula in the evaluations at 7, 14 and 21 DAA.

It was also noted that the formulation containing 2,4-D acid form displayed changes in the volatility of the herbicide and thus the salt form may be preferred for some agronomists.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A solid herbicidal composition made by mixing two synthetic auxin herbicides and an ALS inhibitor herbicide with a neutralizing agent, wherein:
    the two synthetic auxin herbicides consist of 2,4-D acid and picloram acid;
    the ALS inhibitor consists of metsulfuron methyl; and
    the neutralizing agent consists of dibasic ammonium phosphate.

2. The herbicidal composition of claim 1 further comprising at least one agrochemically acceptable excipient or adjuvant.

3. A kit comprising the herbicidal composition as claimed in claim 1.

* * * * *